United States Patent
Okuyama

(10) Patent No.: US 11,182,157 B2
(45) Date of Patent: Nov. 23, 2021

(54) INFORMATION PROCESSING DEVICE, ARITHMETIC DEVICE, AND INFORMATION PROCESSING METHOD

(71) Applicant: HITACHI, LTD., Tokyo (JP)

(72) Inventor: Takuya Okuyama, Tokyo (JP)

(73) Assignee: HITACHI, LTD., Tokyo (JP)

(*) Notice: Subject to any disclaimer, the term of this patent is extended or adjusted under 35 U.S.C. 154(b) by 0 days.

(21) Appl. No.: 17/047,776

(22) PCT Filed: Apr. 26, 2019

(86) PCT No.: PCT/JP2019/017996
§ 371 (c)(1),
(2) Date: Oct. 15, 2020

(87) PCT Pub. No.: WO2019/216277
PCT Pub. Date: Nov. 14, 2019

(65) Prior Publication Data
US 2021/0117188 A1  Apr. 22, 2021

(30) Foreign Application Priority Data

May 8, 2018 (JP) .............................. JP2018-089773

(51) Int. Cl.
*G06F 9/30* (2018.01)
*G06F 17/16* (2006.01)

(52) U.S. Cl.
CPC ........ *G06F 9/3001* (2013.01); *G06F 9/30036* (2013.01); *G06F 17/16* (2013.01)

(58) Field of Classification Search
None
See application file for complete search history.

(56) References Cited

U.S. PATENT DOCUMENTS

| 10,339,466 B1* | 7/2019 | Ding | G06N 20/00 |
| 2015/0205759 A1* | 7/2015 | Israel | G06N 10/00 |
| | | | 703/2 |

(Continued)

FOREIGN PATENT DOCUMENTS

JP  2016-051313 A  4/2016

OTHER PUBLICATIONS

Shrivastav, G.P., et al., Ground-state morphologies in the random-field Ising model Scaling properties and non-Porod behavior, Physical Review. E 90 pp. 032140-1 to 032140-9. (Year: 2014).*

(Continued)

*Primary Examiner* — Eric Coleman
(74) *Attorney, Agent, or Firm* — Mattingly & Malur, PC

(57) ABSTRACT

To efficiently search for a ground state of an Ising model and efficiently solve a combinatorial optimization problem. An information processing device represents an interaction relation of an Ising model as a complete bipartite graph in which N spins of a first spin group and N spins of a second spin group are connected to each other, stores an energy function in which an interaction between an i-th spin of the first spin group and a j (=i)-th spin of the second spin group is set such that the i-th spin of the first spin group and the j-th spin of the second spin group have the same value and searches for a ground state of the Ising model based on the energy function. The information processing device searches for the ground state by applying an algorithm of a simulated annealing method to the above-described energy function.

11 Claims, 7 Drawing Sheets

(56) References Cited

U.S. PATENT DOCUMENTS

| | | | |
|---|---|---|---|
| 2016/0062704 A1* | 3/2016 | Yamaoka | G06N 3/0445 |
| | | | 711/104 |
| 2016/0260013 A1 | 9/2016 | Ronnow et al. | |
| 2017/0185380 A1* | 6/2017 | Hayashi | G11C 11/16 |
| 2017/0262226 A1* | 9/2017 | Yamaoka | G06F 3/0655 |

OTHER PUBLICATIONS

Yavorsky, A., et al., Highly parallel algorithm for the Ising ground state searching problem, Journal or Computational Physics, pp. 1-22, (Year: 2019).*

Cimasoni, D. et al., The critical temperature for the Ising model on planar doubly periodic graphs., Electronic Journal or Probability, 18 (2013) No. 14, 18 pages. (Year: 2013).*

Clark, C. et al., Resource requirements for fault-tolerant quantum simulation: The ground state of the transverse Ising model, Physical Rev., A 79 062314-1 to 062314-9. (Year: 2009).*

Vicky Choi, "Minor-Embedding in Adiabatic Quantum Computation: I. The Parameter Setting Problem", arXiv:0804.4884v1 [quant-ph] Apr. 30, 2008.

Vicky Choi, "Minor-embedding in adiabatic quantum computation: II. Minor-universal graph design", arXiv:1001.3116v2 [quant-ph] Jan. 19, 2010.

International Search Report of PCT/JP2019/017996 dated Jul. 2, 2019.

* cited by examiner

INFORMATION PROCESSING DEVICE, ARITHMETIC DEVICE, AND INFORMATION PROCESSING METHOD

TECHNICAL FIELD

The present disclosure relates to an information processing device, an arithmetic device, and an information processing method.

BACKGROUND ART

The application is based on Japanese Patent Application No. 2018-089773 filed on May 8, 2018, the content of which is incorporated herein by reference.

Patent Literature 1 discloses "A semiconductor device in which components each serving as a basic constitutional unit are arranged in order to find a solution of an interaction model", and "The semiconductor device includes multiple units each of which includes: a first memory cell for storing a value indicating a state of one node of the interaction model; a second memory cell for storing an interaction coefficient indicating an interaction from another node connected to the one node; a third memory cell for storing a flag for fixing a value of the first memory cell; a first arithmetic circuit that decides a next state of the one node based on a value indicating a state of the other node and the interaction coefficient; and a second arithmetic circuit that decides whether to record a value indicating the next state in the first memory cell according to a value of the flag".

Non-patent Literature 1 discloses minor-embedding in adiabatic quantum optimization.

CITATION LIST

Patent Literature

[Patent Literature 1] Japanese Patent Application Publication No. 2013-61762

Non-Patent Literature

[Non-patent Literature 1] Choi, V. (2008). Minor-embedding in adiabatic quantum computation: I. The parameter setting problem. Quantum Information Processing, 7 (5), 193-209

SUMMARY OF INVENTION

Technical Problem

Many physical and social phenomena can be represented by interaction models. An interaction model is defined by a plurality of nodes constituting the model, interactions between the nodes, and a bias for each node if necessary. Although various models have been proposed in fields of physics and social science, any of them can be interpreted as a form of interaction model.

An Ising Model is one of the interaction models. Searching for a ground state of an Ising model is an optimization problem for obtaining a spin array for minimizing an energy function of the Ising model. Examples of a method of searching for a ground state of an Ising model include a method according to a Markov chain Monte Carlo method (hereinafter, referred to as MCMC). In MCMC, a desired statistic is estimated by performing sampling of a state while stochastically shifting between states.

Here, when a so-called combinatorial optimization problem is converted into a searching problem of a ground state of an Ising model, an interaction between spins has a dense structure (a structure in which individual spins are adjacent to all of the other spins). Therefore, stochastic processing cannot be performed on the spins at the same time, which results in a problem that it becomes difficult to increase the speed of processing, for example, when there is an attempt to search for a ground state of an Ising model using a semiconductor device.

The present disclosure is invented in view of such circumstances, and an object thereof is to provide an information processing device and an information processing method which are capable of efficiently searching for a ground state of an Ising model.

Solution to Problem

An aspect of the present disclosure for accomplishing the above-described object is an information processing device including a storage unit configured to represent an interaction relation of an Ising model as a complete bipartite graph in which N spins of a first spin group and N spins of a second spin group are connected to each other and to store an energy function in which an interaction between an i-th spin of the first spin group and a j (=i)-th spin of the second spin group is set such that the i-th spin of the first spin group and the j-th spin of the second spin group have the same value, and a ground state searching unit configured to search for a ground state of the Ising model based on the energy function.

The problems disclosed in the present application and methods for solving the problems become apparent by the description of embodiments and the drawings.

Advantageous Effects of Invention

According to the present disclosure, it is possible to efficiently search for a ground state of an Ising model.

DESCRIPTION OF EMBODIMENTS

Figure 1:
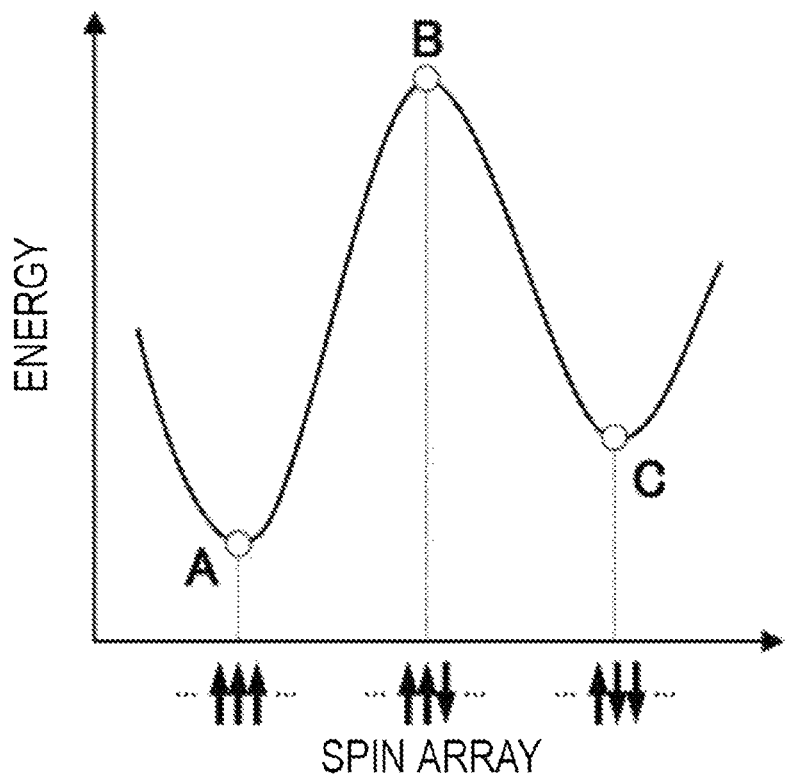
FIG. 1 is a conceptual diagram of an energy landscape of an Ising model.

Hereinafter, an embodiment will be described in detail based on the drawings. In the following description, the same or similar components will be denoted by common reference numerals and signs, and repeated description may be omitted. In a case where there are a plurality of components having the same or similar functions, description may be given by attaching different subscripts to the same reference numerals and signs. In a case where it is not necessary to distinguish between a plurality of components, description may be given by omitting subscripts.

First, an Ising model will be described. The Ising model is a model of statistical mechanics used to explain an action of a magnetic body. The Ising model is defined using states of spins having binary values of +1/−1 (may be "0/1", "up/down", or the like) and an interaction coefficient indicating an interaction between the spins. An energy function H (σ) (generally referred to as Hamiltonian) of an Ising model is represented by the following expression.

$$H(\sigma) = -\sum_{i<j} J_{i,j} \sigma_i \sigma_j \qquad \text{Expression 1}$$

In Expression 1, $\sigma_i$ and $\sigma_j$ respectively represent the value of an i-th spin and the value of a j-th spin, and, represents an interaction coefficient between the i-th spin and the j-th spin.

A right side in Expression 1 is a sum total of energies caused by an interaction between spins. In general, an Ising model is expressed as a non-directed graph, and an interaction from the i-th spin to the j-th spin and an interaction from the j-th spin to the i-th spin may not be distinguished from each other. Therefore, in Expression 1, the influence of an interaction is obtained for a combination of $\sigma_i$ and $\sigma_j$ satisfying i<j.

Searching for a ground state of an Ising model is an optimization problem in which a spin array for minimizing an energy function of the Ising model is obtained. In the present embodiment, the search of a ground state of an Ising model is performed by a Markov chain Monte Carlo method (hereinafter, referred to as MCMC).

FIG. 1 is a conceptual diagram of an energy landscape of an Ising model. In a graph, a horizontal axis represents a spin array, and a vertical axis represents all energies of a system. In a stochastic transition, a stochastic transition from the present state σ to a certain state σ' in the vicinity of the state σ is repeated. A probability that a transition from the state σ to the state σ' is performed is referred to as a transition probability P(σ,σ') below. Examples of the transition probability P(σ,σ') include a transition probability according to a Metropolis method and a transition probability according to a heat bath method. A calculation expression for the transition probability P(σ,σ') according to a Metropolis method is shown below.

$$P(\sigma, \sigma') = \min\left\{1, \exp\left(-\frac{H(\sigma') - H(\sigma)}{T}\right)\right\} \qquad \text{Expression 2}$$

In Expression 2, T is a parameter generally called a temperature and represents the ease of a transition between states.

As a method of generating the vicinal state σ', a method of changing the value of one spin from the present state σ is generally used. States that all spins can take are searched for by sequentially changing spins to be changed one by one. For example, in the case of FIG. 1, the reversal of one spin from a state A leads to a state B, and one more reversal of the spin leads to a state C.

When MCMC is executed while slowly reducing a temperature T from a large value, a state gradually converges on a lowest energy state. As a method of obtaining an optimum solution or an approximate solution using this, simulated annealing (hereinafter, referred to as SA) is used.

In a case where MCMC or SA is applied to an Ising model, the value of a spin is stochastically determined based on Expression 2. Here, it is possible to simultaneously apply a state transition based on Expression 2 to a plurality of spins that are not adjacent to each other. Therefore, it is possible to achieve an increase in the speed of processing of MCMC or SA by preparing a plurality of circuits for realizing stochastic processing based on Expression 2 and updating the values of the plurality of spins, which are not adjacent to each other, in parallel as disclosed in, for example, JP-A-2016-51313.

Figure 2:
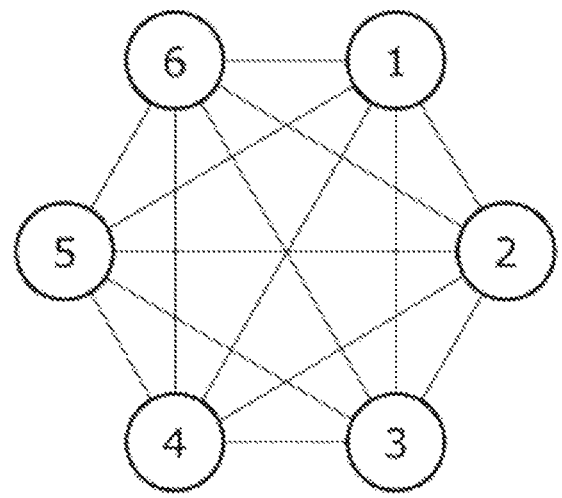
FIG. 2 is a diagram showing an interaction relation between spins of an Ising model as a complete graph.

FIG. 2 is a complete graph (fully coupled graph) representing an interaction relation between all spins of an Ising model in a case where the number of spins is set to 6. When a combinatorial optimization problem is converted into a searching problem of a ground state of an Ising model, an interaction relation between spins has a dense structure (a structure in which individual spins are adjacent to all of the other spins) as shown in the drawing. Therefore, it is not possible to perform stochastic processing of the spins at the same time, and it is difficult to achieve an increase in the speed of the processing of MCMC or SA. Conversely, when a plurality of spins can be simultaneously updated while satisfying a theoretical background required by MCMC for such an Ising model having a dense interaction relation, it is possible to achieve an increase in the speed of processing of MCMC or SA and efficiently solve a combinatorial optimization problem. Based on such a viewpoint, in the present embodiment, a ground state is obtained by a method of representing (simulating) an interaction relation of an Ising model as a complete bipartite graph. Hereinafter, this method will be described.

Figure 3:
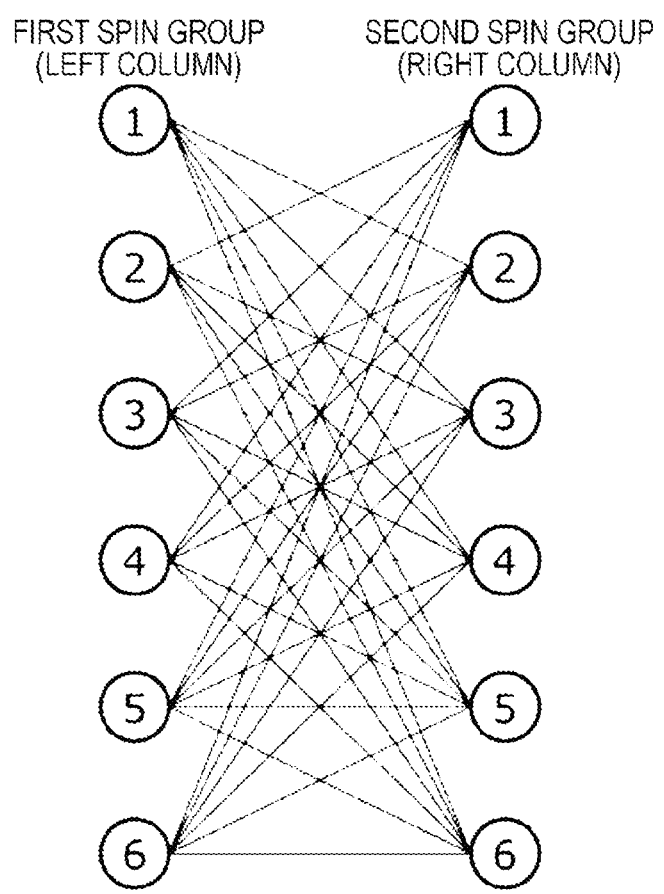
FIG. 3 is a diagram showing an interaction relation between spins of an Ising model as a complete bipartite graph.

FIG. 3 is a diagram showing an interaction relation of an Ising model as a complete bipartite graph. In the present example, the number of spins is set to 6. An interaction $J_{i,j}$ acts between an i-th spin of a spin group in a left column shown in the drawing (hereinafter, referred to as a first spin group) and a j-th spin of a spin group in a right column (hereinafter, referred to as a second spin group). Hereinafter, an interaction coefficient between the i-th spin of the first spin group and the j-th spin of the second spin group will be denoted by $w_i$.

As disclosed in Choi, V. (2008). Minor-embedding in adiabatic quantum computation: I. The parameter setting problem. Quantum Information Processing, 7 (5), 193-209, when the interaction $w_i$ is set to a sufficiently large value, the i-th spin of the first spin group and the j (=i)-th spin of the second spin group have the same value in a ground state of the Ising model shown in the drawing. For example, Choi, V. (2008). Minor-embedding in adiabatic quantum computation: I. The parameter setting problem. Quantum Information Processing, 7 (5), 193-209. gives that the first spin group and the second spin group have the same value when the interaction coefficient $w_i$ satisfies the following Expression 3.

$$w_i \geq \sum_i |J_{i,j}| \qquad \text{Expression 3}$$

It can be indicated that values satisfying the following Expression 4 or Expression 5 also satisfy a condition. Here, λ is a minimum fixed value of a matrix in which an element of an i row and a j column is $J_{i,j}$ and there is no diagonal component.

$$w_i \geq \frac{1}{2}\left(1 - \frac{1}{N}\right)\sum_{j=1}^{N} |J_{i,j}| \qquad \text{Expression 4}$$

$$w_i \geq -\frac{\lambda}{2} \qquad \text{Expression 5}$$

It is assumed that the first spin group and the second spin group have the same value in a ground state. A total number of spins of each of the first spin group and the second spin group is set to N, and the value of the i-th spin of each of the first spin group and the second spin group in a ground state is set to $S_i$ (i=1 to N). Here, an energy H of an Ising model in a ground state can be represented by the following expression.

$$H = -2\sum_{i<j} J_{i,j} S_i S_j - \sum_i w_i \qquad \text{Expression 6}$$

In Expression 6, $w_i$ in a second term on a right side is an interaction coefficient between the i-th spin of the first spin group and the j (=i)-th spin of the second spin group and is a constant that does not depend on and $S_N$. That is, the values of $S_1, \ldots,$ and $S_N$ are solutions of the following expression.

$$\arg\min_{x_1, \ldots, x_N} -\sum_{i<j} J_{i,j} x_i x_j \qquad \text{Expression 7}$$

Thus, the spins $S_1, \ldots,$ and $S_N$ can be regarded as $\sigma_1, \ldots,$ and $\sigma_N$ for minimizing Expression 1 based on an Ising model represented by a complete graph. That is, a spin array of each column in a ground state of a model represented by the complete bipartite graph shown in FIG. 3 is equal to that in a ground state of an Ising model represented by the complete graph (fully coupled graph) shown in FIG. 2. Since the graph shown in FIG. 3 is a bipartite graph, there is no interaction between adjacent spins of the first spin group, and similarly, there is no interaction between adjacent spins of the second spin group. Therefore, when MCMC is executed on the model shown in FIG. 3, it is possible to update the values of spins of each group at the same time and efficiently search for a ground state.

Subsequently, a case where spins are updated using a Metropolis method will be considered. In the following description, the values of spins of a first spin group are represented by $\sigma^L_1, \ldots,$ and $\sigma^L_N$, and the values of spins of a second spin group are similarly represented by $\sigma^R_1, \ldots,$ and $\sigma^R_N$. Here, a differential ΔH of an energy H at the time of reversing the value $\sigma^R_i$ of the i-th spin of the second spin group can be obtained from the following expression.

$$\Delta H = 2\sigma_i^R \left( w_i \sigma_i^L + \sum_{k \neq i} J_{i,k} \sigma_k^L \right) \qquad \text{Expression 8}$$

As described above, an acceptance probability (transition probability) of a state transition at a temperature T in a Metropolis method is represented by Expression 2. Thus, when a uniform random number u (0<u≤1) is used, a condition in which a state transition is accepted can be represented by the following expression.

$$\Delta H \leq -T \cdot \ln(u) \qquad \text{Expression 9}$$

Here, a case where the value $\sigma^R_i$ of the spin of the second spin group is set to +1 after a state transition is considered. First, when the value $\sigma^R_i$ of the spin of the second spin group before the state transition is +1, a condition is satisfied when the following expression is established from ΔH>−T·ln (u), that is, Expression 8.

$$w_i \sigma_i^L + \sum_{k \neq i} J_{i,k} \sigma_k^L > -\frac{T \cdot \ln(u)}{2} \qquad \text{Expression 10}$$

Similarly, the value $\sigma^R_i$ of the spin of the second spin group after the state transition is −1, the value $\sigma^R_i$ of the spin of the second spin group after the state transition is set to +1 when the following expression is established from ΔH≤−T·ln (u), that is, Expression 8.

$$w_i \sigma_i^L + \sum_{k \neq i} J_{i,k} \sigma_k^L \geq \frac{T \cdot \ln(u)}{2} \qquad \text{Expression 11}$$

Thus, when the following expression is satisfied independently of the value $\sigma^R_i$ of the spin of the second spin group before the state transition, it can be understood that the value $\sigma^R_i$ of the spin of the second spin group after the state transition is set to +1.

$$w_i \sigma_i^L + \sum_{k \neq i} J_{i,k} \sigma_k^L \geq \sigma_i^R \frac{-T \cdot \ln(u)}{2} \qquad \text{Expression 12}$$

Consequently, in order to execute a state transition according to a Metropolis method, the next state of the value $\sigma^R_i$ of the spin of the second spin group may be obtained from the following expression. A function "sign(x)" in the following expression is a function for returning +1 when x≥0 and −1 when x<0.

$$\sigma_i^R \leftarrow \text{sign}\left(2\sum_{k \neq i} J_{i,k} \sigma_k^L + 2w_i \sigma_i^L + \sigma_i^R \cdot T \cdot \ln(u)\right) \qquad \text{Expression 13}$$

Here, Expression 13 is an expression which is focused on any one spin of the second spin group to determine the next state of the spin according to a Metropolis method. When an interaction $J_{i,j}$ acting between the i-th spin of the first spin group and the j-th spin of the second spin group is sufficiently large, it is possible to simultaneously apply Expression 13 to the values $\sigma^R_i$ of a plurality of spins of the second spin group. Thus, in a case where the plurality of spins are updated simultaneously, the next states of the spins of the second spin group may be obtained from the following expression. Here, it is assumed that a function "sign" shown in the following expression gives a sign to each element of a vector given to an argument.

$$\begin{bmatrix} \sigma_1^R \\ \vdots \\ \sigma_n^R \end{bmatrix} \leftarrow \text{sign}\left(2J\begin{bmatrix} \sigma_1^L \\ \vdots \\ \sigma_n^L \end{bmatrix} + \right.$$

$$\left. 2\begin{bmatrix} w_i & & O \\ & \ddots & \\ O & & \omega_n \end{bmatrix}\begin{bmatrix} \sigma_1^L \\ \vdots \\ \sigma_n^L \end{bmatrix} + T\begin{bmatrix} \ln u_1 & & O \\ & \ddots & \\ O & & \ln u_n \end{bmatrix}\begin{bmatrix} \sigma_1^R \\ \vdots \\ \sigma_n^R \end{bmatrix}\right)$$

Expression 14

Although an update rule for the spin of the second spin group has described above, the same applies to the spin of the first spin group, and the next update rule can be obtained.

$$\begin{bmatrix} \sigma_1^L \\ \vdots \\ \sigma_n^L \end{bmatrix} \leftarrow \text{sign}\left(2J\begin{bmatrix} \sigma_1^R \\ \vdots \\ \sigma_n^R \end{bmatrix} + \right.$$

$$\left. 2\begin{bmatrix} w_i & & O \\ & \ddots & \\ O & & w_n \end{bmatrix}\begin{bmatrix} \sigma_1^R \\ \vdots \\ \sigma_n^R \end{bmatrix} + T\begin{bmatrix} \ln u_1 & & O \\ & \ddots & \\ O & & \ln u_n \end{bmatrix}\begin{bmatrix} \sigma_1^L \\ \vdots \\ \sigma_n^L \end{bmatrix}\right)$$

Expression 15

Figure 4:
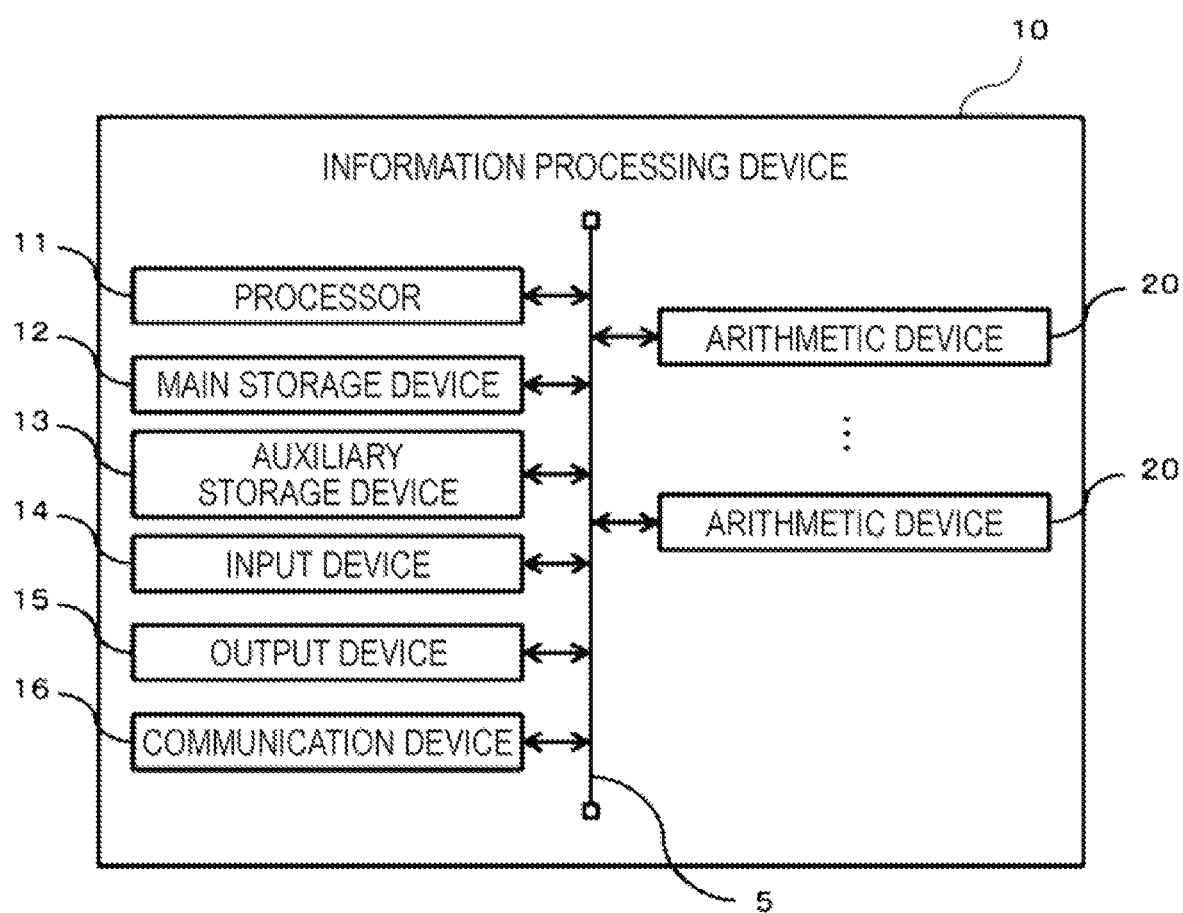
FIG. 4 shows a schematic configuration of an information processing device.

FIG. 4 is an example of an information processing device that searches for a ground state of an Ising model based on Expression 14 and Expression 15. As shown in the drawing, an information processing device 10 includes a processor 11, a main storage device 12, an auxiliary storage device 13, an input device 14, an output device 15, a communication device 16, one or more arithmetic devices 20, and a system bus 5 that communicatively connects these devices to each other. The information processing device 10 may be realized using virtual information processing resources, such as a cloud server, which are partially or entirely provided by a cloud system. The information processing device 10 may be realized by, for example, a plurality of information processing devices that operate in cooperation with each other and are communicatively connected to each other.

The processor 11 is configured using, for example, a central processing unit (CPU) or a micro processing unit (MPU). The main storage device 12 is a device that stores programs and data and is, for example, a read only memory (ROM) (a static random access memory (SRAM), a non-volatile RAM (NVRAM), a mask read only memory (mask ROM), a programmable ROM (PROM), or the like), a random access memory (RAM) (a dynamic random access memory (DRAM) or the like), or the like. The auxiliary storage device 13 is a hard disk drive, a flash memory, a solid state drive (SSD), an optical storage device (a compact disc (CD), a digital versatile disc (DVD), or the like), or the like. Programs and data stored in the auxiliary storage device 13 are read into the main storage device 12 at any time.

The input device 14 is a user interface that receives an input of information from a user and is, for example, a keyboard, a mouse, a card reader, a touch panel, or the like. The output device 15 is a user interface that provides information to the user and is, for example, a display device that visualizes various information (a liquid crystal display (LCD), a graphic card, or the like), a sound output device (speaker), a printing device, or the like. The communication device 16 is a communication interface that communicates with other devices and is, for example, a network interface card (NIC), a wireless communication module, a universal serial interface (USB) module, a serial communication module, or the like.

The arithmetic device 20 is a device that executes processing related to the searching of a ground state of an Ising model. The arithmetic device 20 may be a device, such as a graphics processing unit (GPU), which has a form of an extension card mounted on the information processing device 10. The arithmetic device 20 is configured by hardware such as a complementary metal oxide semiconductor (CMOS) circuit, a field programmable gate array (FPGA), or an application specific integrated circuit (ASIC). The arithmetic device 20 includes a control device, a storage device, an interface for connection to the system bus 5, and the like, and transmits and receives a command and information to and from the processor 11 through the system bus 5. The arithmetic device 20 may be a device which is communicatively connected to other arithmetic devices 20, for example, through a communication line and operates in cooperation with the other arithmetic devices 20. Functions realized by the arithmetic devices 20 may be realized by causing, for example, a processor (a CPU, a GPU, or the like) to execute a program.

Figure 5:
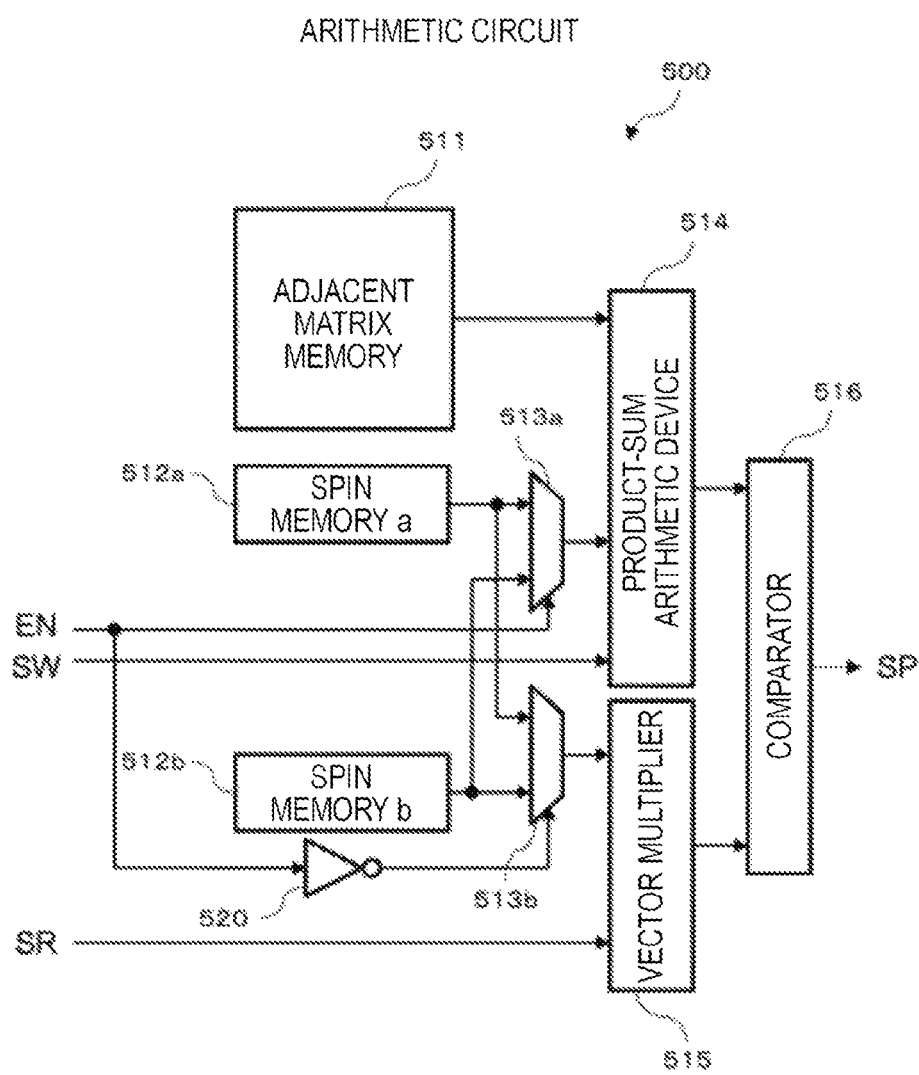
FIG. 5 is a block diagram of an arithmetic circuit.

FIG. 5 is a block diagram of a circuit for explaining an operation principle of the arithmetic device 20 (hereinafter, referred to as an arithmetic circuit 500). The arithmetic circuit 500 realizes functions equivalent to Expression 14 and Expression 15. Hereinafter, an operation principle of the arithmetic device 20 will be described together with the drawing. The number of spins handled by the arithmetic circuit 500 is denoted by N in the following description.

As shown in the drawing, the arithmetic circuit 500 includes an adjacent matrix memory 511, a first spin memory 512a, a second spin memory 512b, a first selector 513a, a second selector 513b, a product-sum arithmetic device 514, a vector multiplier 515, a comparator 516, and a NOT circuit 520.

Information indicating an interaction J (hereinafter, referred to as an adjacent matrix) is stored in the adjacent matrix memory 511. The adjacent matrix is a matrix of N rows by N columns in which an element of an i row and a j column is an interaction coefficient $J_{i,j}$. The adjacent matrix, which is generally a symmetrical matrix, can reduce the amount of use of the adjacent matrix memory 511 using such symmetry.

Information of an N-dimensional vector indicating the state of spins of a first spin group in the above-described complete bipartite graph is stored in the first spin memory 512a. The second spin memory 512b stores information of an N-dimensional vector indicating the state of spins of a second spin group in the above-described complete bipartite graph.

As shown in the drawing, a signal EN, a signal SW, and a signal SR are input to the arithmetic circuit 500. The comparator 516 outputs a signal SP.

The signal EN is a signal that periodically repeats the values of H (high) and L (low). When the signal EN is H (high), the first selector 513a outputs the value of the first spin memory 512a, and the second selector 513b outputs the value of the second spin memory 512b. When the signal EN is L (low), the first selector 513a outputs the value of the second spin memory 512b, and the second selector 513b outputs the value of the first spin memory 512a. The first selector 513a and the second selector 513b may operate as described above according to a signal EN having a phase opposite to that described above (NAND).

The signal SW is a signal representing a vector of an N element (N-dimensional vector).

The value of the adjacent matrix (interaction coefficient $J_{i,j}$) stored in the adjacent matrix memory 511, the signal SW, and an output of the first selector 513a are input to the product-sum arithmetic device 514. Here, when the N-dimensional vector which is an output of the first selector 513a is represented by x and the N-dimensional vector represented by the signal SW are represented by w=($w_1$, ..., $w_N$), the product-sum arithmetic device 514 outputs an N-dimensional vector y in which y=2(A+diag($w_1$, ..., $w_N$))x.

The signal SR indicates an N-dimensional vector in which respective elements are random numbers that are independent of each other. In the present example, each of the elements is obtained by multiplying a temperature T by a random number −ln (u). Here, u is a uniform random number (0<u≤1).

An N-dimensional vector which is output from the second selector 513b and an N-dimensional signal SR are input to the vector multiplier 515. The vector multiplier 515 calculates and outputs a product of corresponding elements, such as a product of first elements and a product of second elements. Thus, an output signal of the vector multiplier 515 is also an N-dimensional vector.

An N-dimensional vector which is output from the product-sum arithmetic device 514 and an N-dimensional vector which is output from the vector multiplier 515 are input to the comparator 516. The comparator 516 compares corresponding elements of the input N-dimensional vectors with each other and outputs results (a magnitude relation between the elements) of the comparison. For example, when the comparator 516 compares first elements in two input signals of the comparator 516, the comparator sets 1 for the first element of the comparator 516 in a case where the signal of the product-sum arithmetic device 514 is larger and sets −1 therefor in a case where the signal of the product-sum arithmetic device 514 is smaller.

The signal SP which is output from the comparator 516 indicates the next state of a spin based on the above-described MCMC. Information of the signal SP is written in the first spin memory 512a when the signal EN is H (High), and the information is written in the second spin memory 512b when the signal EN is L (Low).

Figure 6:
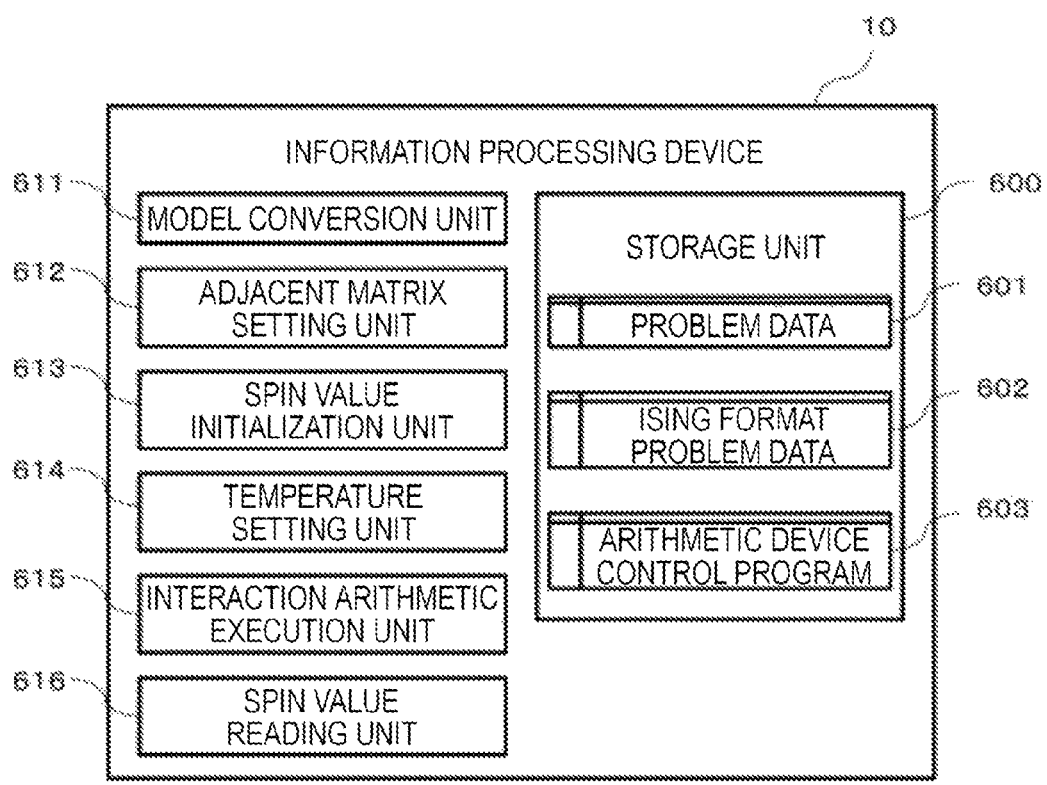
FIG. 6 is a diagram showing main functions included in the information processing device.

FIG. 6 shows main functions (software configuration) included in the information processing device 10. As shown in the drawing, the information processing device 10 includes a storage unit 600, a model conversion unit 611, an adjacent matrix setting unit 612, a spin value initialization unit 613, a temperature setting unit 614, an interaction arithmetic execution unit 615, and a spin value reading unit 616. These functions are realized by the processor 11 reading and executing programs stored in the main storage device 12 or realized by hardware included in the arithmetic device 20. The information processing device 10 may have other functions such as an operating system, a file system, a device driver, and a database management system (DBMS), in addition to the above-described functions.

Among the above-described functions, the storage unit 600 stores problem data 601, Ising format problem data 602, and an arithmetic device control program 603 in the main storage device 12 or the auxiliary storage device 13. The problem data 601 are data in which, for example, a combinatorial optimization problem or the like is described in a predetermined description format. For example, the problem data 601 are set by a user through a user interface (an input device, an output device, a communication device, or the like). The Ising format problem data 602 are data generated by the model conversion unit 611 converting the problem data 601 into data in an Ising model format. The arithmetic device control program 603 is a program which is executed when the interaction arithmetic execution unit 615 controls the arithmetic device 20 or which is loaded into the individual arithmetic devices 20 by the interaction arithmetic execution unit 615 and executed by the arithmetic device 20.

The model conversion unit 611 converts the problem data 601 into the Ising format problem data 602 which are data in an Ising model format. The function of the model conversion unit 611 may not be necessarily mounted on the information processing device 10, and the information processing device 10 may take in the Ising format problem data 602 generated by other information processing devices or the like through the input device 14 and the communication device 16.

The adjacent matrix setting unit 612 sets an adjacent matrix (interaction coefficient $J_{i,j}$) in a case where an interaction relation of an Ising model based on the Ising format problem data 602 is represented by the above-described complete bipartite graph in the adjacent matrix memory 511.

The spin value initialization unit 613 initializes the values of spins stored in the first spin memory 512a and the second spin memory 512b of the arithmetic device 20. The spin value initialization unit 613 sets, for example, all of the values $\sigma^L_1$, ..., and $\sigma^L_N$ of the spins of the first spin group in the complete bipartite graph and the values $\sigma^R_1$, ..., and $\sigma^R_N$ of the spins of the second spin group to "1" or "−1" with a probability of 50%.

The temperature setting unit 614 sets the values of temperatures T in Expression 14 and Expression 15 which are used when the interaction arithmetic execution unit 615 searches for a ground state of an Ising model.

The interaction arithmetic execution unit 615 performs an arithmetic operation for searching for a ground state of an Ising model (hereinafter, referred to as an interaction arithmetic operation) for each temperature T set by the temperature setting unit 614 according to Expression 14 and Expression 15. When the interaction arithmetic operation is performed, the interaction arithmetic execution unit 615 changes, for example, the temperature T from a high temperature to a low temperature.

When the searching of a ground state of an Ising model by the interaction arithmetic execution unit 615 is terminated, the spin value reading unit 616 reads the values of spins stored in the first spin memory 512a or the second spin memory 512b and outputs the read values to the output device 15 and the communication device 16.

Figure 7:
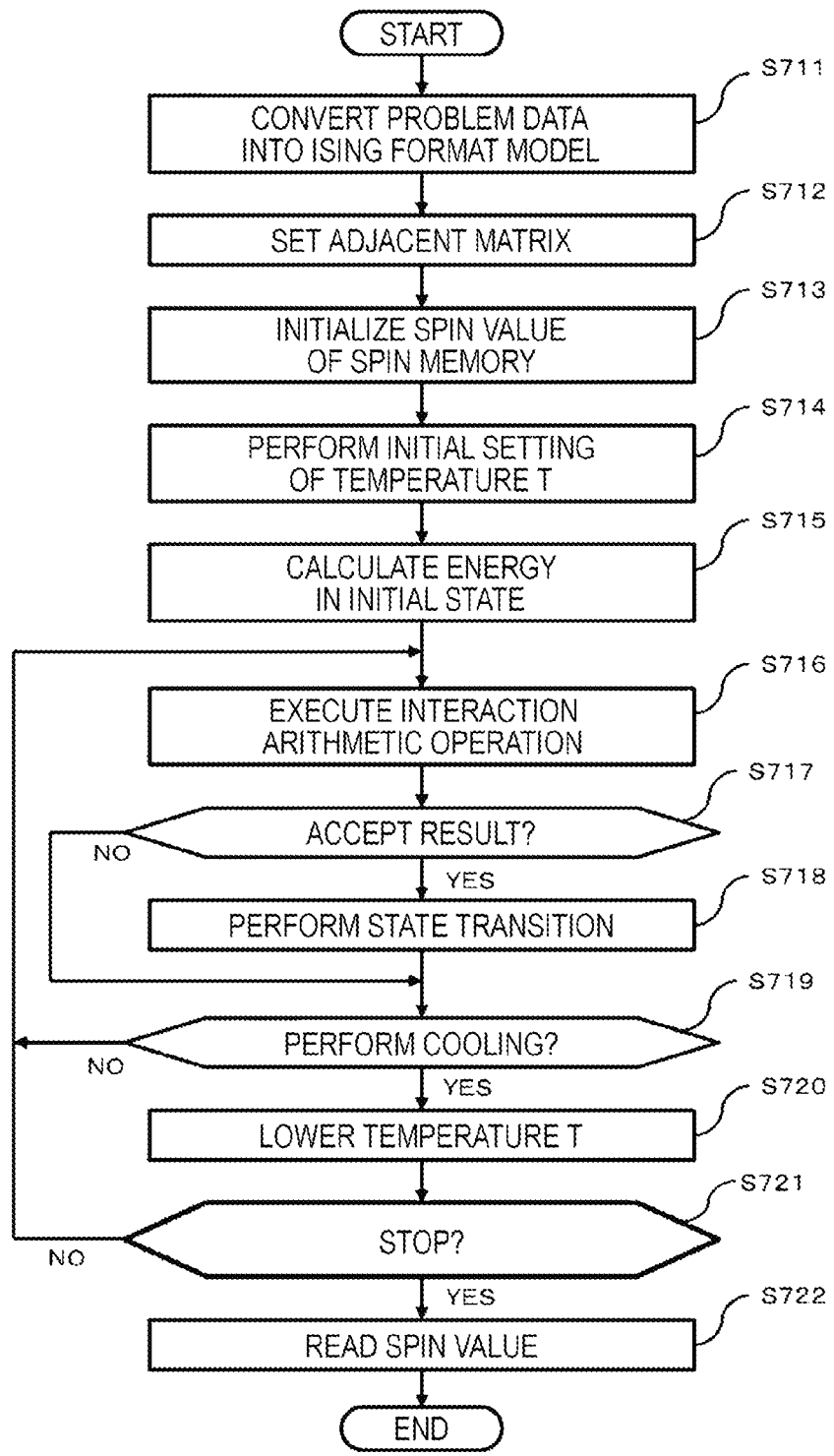
FIG. 7 is a flowchart showing a ground state searching process.

FIG. 7 is a flowchart showing processing performed by the information processing device 10 at the time of searching for a ground state of an Ising model (hereinafter, referred to as a ground state searching process S700). Hereinafter, the ground state searching process S700 will be described together with the drawing. Hereinafter, a letter "S" attached before a reference numeral means a processing step. The ground state searching process S700 is started, for example, in response to an instruction or the like received from a user through the input device 14.

As shown in the drawing, first, the model conversion unit 611 converts the problem data 601 into the Ising format problem data 602 (S711). In a case where the storage unit 600 already stores the Ising format problem data 602, the process of S711 is omitted. The process of S711, the process of S712, and the subsequent processes may be executed by different devices. The process of S711, the process of S712, and the subsequent processes may be executed at different timings (for example, it is considered that the process of S711 is performed in advance).

Subsequently, the adjacent matrix setting unit 612 sets an adjacent matrix in the adjacent matrix memory 511 (S712).

The adjacent matrix can also be set or edited by a user through a user interface (realized by, for example, the input device 14, the output device 15, the communication device 16, or the like).

Subsequently, the spin value initialization unit 613 initializes the values of the spins stored in the first spin memory 512a and the second spin memory 512b (S713).

Subsequently, the temperature setting unit 614 sets temperatures Tk (k=1, 2, 3, . . . ) shown in Expression 14 and Expression 15 (S714). The above-described subscript k represents the type of temperature T to be set.

Subsequently, the interaction arithmetic execution unit 615 calculates an energy H in an initial state (S715). Subsequently, the interaction arithmetic execution unit 615 generates a next state by executing an interaction arithmetic operation based on Expression 14 and Expression 15, obtains an energy H' in the next state based on the generated next state, and obtains a differential $\Delta H$ (=H'−H) (S716).

Subsequently, the interaction arithmetic execution unit 615 determines whether to accept the generated next state. The interaction arithmetic execution unit 615 performs the above-described determination based on, for example, a metropolis standard (a standard determined by $\Delta H$ and $T_k$).

In a case where it is determined that the interaction arithmetic execution unit 615 accepts the next state (S717: YES), the processing shifts to the next state (S718). Specifically, the values of the spins of the second spin group are set to be the next state in a case where the interaction arithmetic operation is executed based on Expression 14, and the values of the spins of the first spin group are set to be the next state in a case where the interaction arithmetic operation is executed based on Expression 15.

On the other hand, in a case where it is determined that the interaction arithmetic execution unit 615 does not accept the next state (S717: NO), the processing proceeds to S719.

In S719, the interaction arithmetic execution unit 615 determines whether to lower the temperature T. For example, the interaction arithmetic execution unit 615 determines to lower the temperature T in a case where a loop of S716 to S719 is repeated a predetermined number of times or more.

In a case where the interaction arithmetic execution unit 615 determines to lower the temperature T (S719: YES), the processing proceeds to S720, and the interaction arithmetic execution unit 615 lowers the temperature T. For example, in the case of exponential annealing, the interaction arithmetic execution unit 615 sets a relation of $T_{k+1}=\gamma \cdot T_k$ ($\gamma$ is a coefficient for determining a cooling speed). On the other hand, in a case where the interaction arithmetic execution unit 615 determines not to lower the temperature T (S719: NO), the processing returns to S716.

Subsequently, the interaction arithmetic execution unit 615 determines whether a stopping condition has been established (for example, whether the temperature T has reached a lowest temperature which has been set in advance) (S721). In a case where the interaction arithmetic execution unit 615 determines that a stopping condition has been established (S721: YES), the processing proceeds to S722. On the other hand, in a case where the interaction arithmetic execution unit 615 determines that a stopping condition has not been established (S721: NO), the processing returns to S716.

In S722, the spin value reading unit 616 reads and outputs the values of the spins stored in the first spin memory 512a and the second spin memory 512b. Thereby, the ground state searching process S700 is terminated.

In order to verify effects in a case where the information processing device 10 having the above-described configuration searches for a ground state of an Ising model, results of searching of a ground state of an Ising model in a case where interaction relations between all spins of the Ising model are represented by a complete graph (hereinafter, referred to as a technique in the related art) are compared with results of searching of a ground state of an Ising model in a case where interaction relations between spins of the Ising model are represented by a complete bipartite graph (hereinafter, referred to as a technique in the present disclosure).

First, for each of the technique in the related art and the technique in the present disclosure, the smallest values (including minimum values) of energies and the number of appearances of each of the smallest values are obtained in a case where the ground state searching process S700 is performed by setting the number of spins to 16 and changing the temperature T from 1000 degrees to 20 degrees. An adjacent matrix (interaction coefficient $J_{i,j}$) is randomly set between "−127" and "127". The number of times the spins are updated is set to 1000. The number of trials is set to 100.

Table 1 shows the smallest values of energies (local solutions or optimum solutions) and the number of appearances in the ground state searching process S700 in a case where the technique in the related art is used. Table 2 shows the smallest values of energies (local solutions or optimum solutions) and the number of appearances in the ground state searching process S700 in a case where the technique in the present disclosure is used.

TABLE 1

| Smallest Value of Energy | The Number of Appearance |
| --- | --- |
| −3246 | 54 |
| −3234 | 36 |
| −2968 | 7 |
| −2840 | 3 |

TABLE 2

| Smallest Value of Energy | The Number of Appearance |
| --- | --- |
| −3246 | 60 |
| −3234 | 38 |
| −2968 | 2 |

From Table 1 and Table 2, it can be understood that it is possible to accurately specify the smallest values of energies even when the technique in the present disclosure is used, similar to the technique in the related art.

Figure 8:
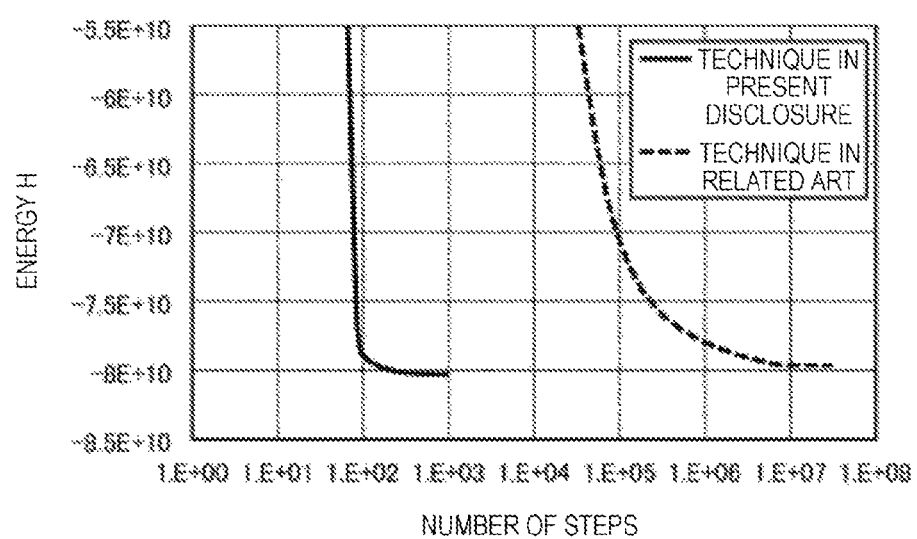
FIG. 8 is a graph showing a relationship between the number of steps and an energy H in MCMC.

FIG. 8 is a graph showing a relationship between the number of steps and an energy H in MCMC in a case where the number of spins is set to 32768 and an adjacent matrix (interaction coefficient $J_{i,j}$) is randomly set between "−32767" and "32767" to perform the ground state searching process S700 by the technique in the related art and the technique in the present disclosure. As shown in the drawing, it can be understood that an energy H reaches the smallest value with a smaller number of steps by the technique in the present disclosure than that by the technique in the related art. That is, according to the technique in the present disclosure, it is possible to efficiently search for a ground state of an Ising model.

As described above in detail, according to the information processing device 10 of the present embodiment, it is possible to efficiently search for a ground state of an Ising model. Therefore, it is possible to efficiently solve a combinatorial optimization problem. The information processing device 10 (including the arithmetic device 20) has a simple configuration and can be easily manufactured at a low cost.

While the embodiment has been described above in detail, the present disclosure is not limited to the above-described embodiment, and it is needless to say that various modifications can be made without departing from the scope. For example, the above-described embodiment has been described in detail for easy understanding of the present disclosure and does not necessarily include all of the configurations described above. Addition, deletion, and substitution of another configuration can be made to a portion of the configurations of the embodiment.

In addition to the above-described configurations, functional units, processing units, processing means, and the like may be realized by hardware by designing some or all of those with, for example, an integrated circuit. The above-described configurations, functions, and the like may be realized by software by a processor analyzing and executing programs for realizing the functions. Information such as programs, tables, and files for realizing the functions can be recorded in a recording medium such as a memory, a hard disk, or a solid state drive (SSD) or a recording medium such as an IC card, an SD card, or a DVD.

In the above-described drawings, control lines and information lines considered to be required for explanation are shown, and all of the mounted control lines and information lines are not necessarily shown. For example, it may be considered that almost all of the components are actually connected to each other.

The arrangement forms of various functional units, various processing units, and various databases of the information processing device 10 described above are merely examples. The arrangement forms of various functional units, various processing units, and various databases may be changed to optimum arrangement forms from the viewpoints of performances of hardware and software included in the information processing device 10, processing efficiency, communication efficiency, and the like.

A configuration (schema and the like) of a database storing the above-described various data may be flexibly changed from the viewpoints of efficient use of resources, an improvement in processing efficiency, an improvement in access efficiency, an improvement in searching efficiency, and the like.

REFERENCE SIGNS LIST 10 information processing device
11 processor
12 main storage device
20 arithmetic device
511 adjacent matrix memory
512a first spin memory
512b second spin memory
513a first selector
513b second selector
514 product-sum arithmetic device
515 vector multiplier
516 comparator
520 NOT circuit
600 storage unit
601 problem data
602 Ising format problem data
603 arithmetic device control program
611 model conversion unit
612 adjacent matrix setting unit
613 spin value initialization unit
614 temperature setting unit
615 interaction arithmetic execution unit
616 spin value reading unit

The invention claimed is:

1. An information processing device comprising:
a storage unit configured to represent an interaction relation of an Ising model as a complete bipartite graph in which each of N spins of a first spin group and each of N spins of a second spin group are connected to each other and to store an energy function in which an interaction between an i-th spin of the first spin group and a j (=i)-th spin of the second spin group is set such that the i-th spin of the first spin group and the j-th spin of the second spin group have the same value; and
a ground state searching unit configured to search for a ground state of the Ising model based on the energy function.

2. The information processing device according to claim 1, wherein a total number of spins of each of the first spin group and the second spin group is set to be N, a value of the i-th spin of the first spin group in a ground state is set to be $S_i$ (i=1 to N), a value of the j-th spin of the second spin group in a ground state is set to be $S_j$ (j=1 to N), an interaction coefficient between the i-th spin of the first spin group and the j-th spin of the second spin group is set to be $J_{i,j}$, an interaction coefficient between the i-th spin of the first spin group and the j (=i)-th spin of the second spin group is set to be $w_i$, and the interaction coefficient $J_{i,j}$ is set to satisfy the following expression, $$w_i \geq \frac{1}{2}\left(1 - \frac{1}{N}\right)\sum_{j=1}^{N} |J_{i,j}|$$

or the following expression, $$w_i \geq -\frac{\lambda}{2}$$

which is given by a minimum fixed value λ of a matrix in which an element of an i row and a j column is $J_{i,j}$ and there is no diagonal component.

3. The information processing device according to claim 2, wherein the ground state searching unit
searches for the ground state of the Ising model according to an algorithm of a simulated annealing method,
obtains an acceptance probability (transition probability) P(σ,σ') of a state transition at a temperature T which is a parameter representing ease of a transition between states in the searching from the following expression based on a Metropolis method, $$P(\sigma, \sigma') = \min\left\{1, \exp\left(-\frac{H(\sigma') - H(\sigma)}{T}\right)\right\}$$

in a case where values of the spins of the first spin group are represented by $\sigma^L_1, \ldots,$ and $\sigma^L_N$ and values of the spins of the second spin group are represented by $\sigma^R_1, \ldots,$ and $\sigma^R_N$, obtains a differential ΔH of an energy H at the time of reversing the value $\sigma^R_i$ of the i-th spin of the second spin group from the following expression, $$\Delta H = 2\sigma^R_i \left( w_i \sigma^L_i + \sum_{k \ne i} J_{i,k} \sigma^L_k \right)$$

obtains a differential $\Delta H$ of an energy H at the time of reversing the value $\sigma^L_i$ of the i-th spin of the first spin group from the following expression, and $$\Delta H = 2\sigma^L_i \left( w_i \sigma^R_i + \sum_{k \ne i} J_{i,k} \sigma^R_k \right)$$

determines a condition that the state transition is accepted in a case where u (0<u≤1) is set to a uniform random number, based on the following expression $$\Delta H \le -T \cdot \ln(u).$$

4. The information processing device according to claim 3, wherein the ground state searching unit obtains a next state of the second spin group by the following expression, and $$\begin{bmatrix} \sigma^R_1 \\ \vdots \\ \sigma^R_n \end{bmatrix} \leftarrow \text{sign}\left( 2J \begin{bmatrix} \sigma^L_1 \\ \vdots \\ \sigma^L_n \end{bmatrix} + 2 \begin{bmatrix} w_1 & & O \\ & \ddots & \\ O & & w_n \end{bmatrix} \begin{bmatrix} \sigma^L_1 \\ \vdots \\ \sigma^L_n \end{bmatrix} + T \begin{bmatrix} \ln u_1 & & O \\ & \ddots & \\ O & & \ln u_n \end{bmatrix} \begin{bmatrix} \sigma^R_1 \\ \vdots \\ \sigma^R_n \end{bmatrix} \right)$$

obtains a next state of the first spin group by the following expression.

$$\begin{bmatrix} \sigma^L_1 \\ \vdots \\ \sigma^L_n \end{bmatrix} \leftarrow \text{sign}\left( 2J \begin{bmatrix} \sigma^R_1 \\ \vdots \\ \sigma^R_n \end{bmatrix} + 2 \begin{bmatrix} w_1 & & O \\ & \ddots & \\ O & & w_n \end{bmatrix} \begin{bmatrix} \sigma^R_1 \\ \vdots \\ \sigma^R_n \end{bmatrix} + T \begin{bmatrix} \ln u_1 & & O \\ & \ddots & \\ O & & \ln u_n \end{bmatrix} \begin{bmatrix} \sigma^L_1 \\ \vdots \\ \sigma^L_n \end{bmatrix} \right).$$

5. The information processing device according to claim 4, further comprising:
one or more arithmetic devices each of which includes
an adjacent matrix memory that stores the interaction coefficient $J_{i,j}$,
a first spin memory that stores the values $\sigma^L_1, \ldots,$ and $\sigma^L_N$ of the spins of the first spin group,
a second spin memory that stores the values $\sigma^R_1, \ldots,$ and $\sigma^R_N$ of the spins of the second spin group,
a product-sum arithmetic device to which the values of the first spin memory or the values of the second spin memory, the values of the adjacent matrix memory, and a signal indicating an N-dimensional vector w= ($w_1, \ldots,$ and $w_N$) are input,
a vector multiplier to which the values of the first spin memory or the values of the second spin memory, and an N-dimensional vector in which elements are random numbers being independent of each other is input, and
a comparator to which the N-dimensional vector output from the product-sum arithmetic device and the N-dimensional vector output from the vector multiplier are input and which compares corresponding elements of the input N-dimensional vectors with each other and outputs a magnitude relation between the elements.

6. An arithmetic device according to claim 5, further comprising:
the adjacent matrix memory;
the first spin memory;
the second spin memory;
the product-sum arithmetic device;
the vector multiplier; and
the comparator.

7. The arithmetic device according to claim 6, wherein the arithmetic device is realized by any one of a complementary metal oxide semiconductor (CMOS) circuit, a field programmable gate array (FPGA), and an application specific integrated circuit (ASIC).

8. An information processing method comprising:
causing an information processing device to represent an interaction relation of an Ising model as a complete bipartite graph in which each of N spins of a first spin group and each of N spins of a second spin group are connected to each other and to store an energy function in which an interaction between an i-th spin of the first spin group and a j (=I)-th spin of the second spin group is set such that the i-th spin of the first spin group and the j-th spin of the second spin group have the same value; and
causing the information processing device to search for a ground state of the Ising model based on the energy function.

9. The information processing method according to claim 8, wherein a total number of spins of each of the first spin group and the second spin group is set to be N, a value of the i-th spin of the first spin group in a ground state is set to be $S_i$ (i=1 to N), a value of the j-th spin of the second spin group in a ground state is set to be $S_j$ (j=1 to N), an interaction coefficient between the i-th spin of the first spin group and the j-th spin of the second spin group is set to be $J_{i,j}$, an interaction coefficient between the i-th spin of the first spin group and the j (=i)-th spin of the second spin group is set to be $w_i$, and the interaction coefficient $J_{i,j}$ is set to satisfy the following expression, $$w_i \ge \frac{1}{2}\left(1 - \frac{1}{N}\right) \sum_{j=1}^{N} |J_{i,j}|$$

or the following expression, $$w_i \ge -\frac{\lambda}{2}$$

which is given by a minimum fixed value $\lambda$ of a matrix in which an element of an i row and a j column is $J_{i,j}$ and there is no diagonal component.

10. The information processing method according to claim 9, wherein the information processing device
searches for the ground state of the Ising model according to an algorithm of a simulated annealing method,
obtains an acceptance probability (transition probability) $P(\sigma,\sigma')$ of a state transition at a temperature T which is a parameter representing ease of a transition between states in the searching from the following expression based on a Metropolis method, $$P(\sigma, \sigma') = \min\left\{ 1, \exp\left(-\frac{H(\sigma') - H(\sigma)}{T}\right) \right\}$$

in a case where values of the spins of the first spin group are represented by $\sigma^L_1, \ldots,$ and $\sigma^L_N$ and values of the spins of the second spin group are represented by $\sigma^R_1, \ldots,$ and $\sigma^R_N$, obtains a differential $\Delta H$ of an energy H at the time of reversing the value $\sigma^R_i$ of the i-th spin of the second spin group from the following expression, $$\Delta H = 2\sigma^R_i \left( w_i \sigma^L_i + \sum_{k \neq i} J_{i,k} \sigma^L_k \right)$$

obtains a differential $\Delta H$ of an energy H at the time of reversing the value $\sigma^L_i$ of the i-th spin of the first spin group from the following expression, and $$\Delta H = 2\sigma^L_i \left( w_i \sigma^R_i + \sum_{k \neq i} J_{i,k} \sigma^R_k \right)$$

determines a condition in which the state transition is accepted in a case where u (0<u≤1) is set to a uniform random number, based on the following expression
$\Delta H \leq -T \cdot \ln(u)$.

11. The information processing method according to claim 10, wherein the information processing device
obtains a next state of the second spin group by the following expression, and $$\begin{bmatrix} \sigma^R_1 \\ \vdots \\ \sigma^R_n \end{bmatrix} \leftarrow \text{sign}\left( 2J \begin{bmatrix} \sigma^L_1 \\ \vdots \\ \sigma^L_n \end{bmatrix} + 2 \begin{bmatrix} w_i & & O \\ & \ddots & \\ O & & w_n \end{bmatrix} \begin{bmatrix} \sigma^L_1 \\ \vdots \\ \sigma^L_n \end{bmatrix} + T \begin{bmatrix} \ln u_1 & & O \\ & \ddots & \\ O & & \ln u_n \end{bmatrix} \begin{bmatrix} \sigma^R_1 \\ \vdots \\ \sigma^R_n \end{bmatrix} \right)$$

obtains a next state of the first spin group by the following expression $$\begin{bmatrix} \sigma^L_1 \\ \vdots \\ \sigma^L_n \end{bmatrix} \leftarrow \text{sign}\left( 2J \begin{bmatrix} \sigma^R_1 \\ \vdots \\ \sigma^R_n \end{bmatrix} + 2 \begin{bmatrix} w_i & & O \\ & \ddots & \\ O & & w_n \end{bmatrix} \begin{bmatrix} \sigma^R_1 \\ \vdots \\ \sigma^R_n \end{bmatrix} + T \begin{bmatrix} \ln u_1 & & O \\ & \ddots & \\ O & & \ln u_n \end{bmatrix} \begin{bmatrix} \sigma^L_1 \\ \vdots \\ \sigma^L_n \end{bmatrix} \right).$$

* * * * *